US007866936B2

(12) United States Patent
Schuck et al.

(10) Patent No.: US 7,866,936 B2
(45) Date of Patent: Jan. 11, 2011

(54) SYSTEM AND METHOD FOR TRANSFERRING MAIL BETWEEN CONTAINERS

(75) Inventors: Karl Lewis Schuck, New Market, MD (US); Jacob L. Timm, Pasadena, MD (US); Stanley Katsuyoshi Wakamiya, Ellicott City, MD (US); Patrick Cowgill, Goshen, KY (US); Stephanie Lauretano Miskiewicz, Columbia, MD (US); Charles Stewart Shaw, Fairfax, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 872 days.

(21) Appl. No.: 11/797,153

(22) Filed: May 1, 2007

(65) Prior Publication Data
US 2008/0271971 A1    Nov. 6, 2008

(51) Int. Cl.
    *B65G 57/00*        (2006.01)
(52) U.S. Cl. ................. 414/790; 271/213; 271/217
(58) Field of Classification Search ............... 414/790, 414/790.1; 271/213, 217, 306, 307
    See application file for complete search history.

(56) References Cited

U.S. PATENT DOCUMENTS

| 3,937,456 | A | * | 2/1976 | Gruodis et al. ............... 271/278 |
| 4,518,160 | A | * | 5/1985 | Lambrechts et al. ........ 271/214 |
| 4,593,816 | A | * | 6/1986 | Langenbeck ................. 206/425 |
| 4,750,729 | A | * | 6/1988 | Kanoto et al. ................ 271/162 |
| 4,866,908 | A | * | 9/1989 | Kunne et al. ................ 53/381.6 |
| 5,135,352 | A | * | 8/1992 | Scata et al. .............. 414/798.8 |
| 5,233,814 | A | * | 8/1993 | Bergerioux et al. ........... 53/536 |
| 5,346,206 | A | * | 9/1994 | Steinhart ..................... 271/305 |
| 5,347,790 | A | * | 9/1994 | Romanenko et al. .......... 53/443 |
| 5,636,723 | A | * | 6/1997 | Bulle et al. ............. 198/367.1 |
| 5,713,713 | A | * | 2/1998 | Syde et al. .................. 414/403 |
| 5,906,468 | A | * | 5/1999 | Vander Syde et al. ....... 414/403 |
| 5,931,634 | A | * | 8/1999 | Neri .......................... 414/790 |
| 5,993,132 | A | * | 11/1999 | Harres et al. .......... 414/416.04 |
| 6,601,847 | B2 | * | 8/2003 | Hendrickson et al. ....... 271/302 |
| 6,840,513 | B1 | * | 1/2005 | Rabindran ................... 271/216 |
| 6,896,471 | B2 | * | 5/2005 | Svyatsky et al. ............ 414/421 |
| 6,935,522 | B1 | * | 8/2005 | Mileaf ........................ 211/189 |
| 6,950,724 | B2 |   | 9/2005 | Mileaf et al. |
| 7,114,908 | B1 | * | 10/2006 | Sarver et al. ............. 414/790.2 |
| 7,461,759 | B2 | * | 12/2008 | Guerra ........................ 221/93 |
| 7,475,520 | B2 | * | 1/2009 | Swider et al. .................. 53/55 |
| 7,500,819 | B2 | * | 3/2009 | Nielsen ...................... 414/790 |
| 7,527,154 | B2 | * | 5/2009 | Kara et al. .................. 209/630 |
| 2004/0193554 | A1 |   | 9/2004 | Hillerich, Jr. et al. |
| 2005/0218046 | A1 |   | 10/2005 | Mileaf et al. |
| 2006/0000752 | A1 |   | 1/2006 | Stubleski et al. |

* cited by examiner

*Primary Examiner*—Douglas A Hess
(74) *Attorney, Agent, or Firm*—Rothwell, Figg, Ernst & Manbeck, P.C.

(57) ABSTRACT

A system and method for transferring mail between containers in an orderly and secure manner. The system and method utilize ejection rods to lift mail from an input tray into a transfer box assembly that deposits the mail into an output tray in an orderly, stable and secure manner, ensuring that mail is not shuffled or lost during the transfer process.

20 Claims, 9 Drawing Sheets

SYSTEM AND METHOD FOR TRANSFERRING MAIL BETWEEN CONTAINERS

BACKGROUND OF THE INVENTION

1. Field of the Invention

The present invention relates to a system and method for transferring mail between containers so as to maintain orientation and stability of the mail during the transfer process.

2. Discussion of Related Art

Automated mail handling equipment, such as mail sorting systems, have dramatically improved the efficiency of mail processing operations. The United States Postal Service (hereafter "USPS"), which handles nearly 700 million pieces of mail each day, is constantly improving and upgrading their mail handling systems and methods to better serve their customers and remain competitive.

As can be imagined, how mail is received, distributed, sorted and organized is essential to optimizing the efficiency and productivity of overall mail processing operations.

Mail processing typically occurs at a centralized facility where the mail is received, sorted and grouped in preparation for delivery. At least some of these tasks are accomplished through the use of automated mail processing equipment that, among other things, transfers mail stacks from one container to another.

A frequent problem that arises when mail is transferred between containers is that, upon transfer, the mail easily changes orientation, changes sequence or slips out of the trays, becoming lost and/or damaged.

The prior art has a number of systems and methods that have been developed over the years to aid mail sorting, processing and delivery. However, the prior art does not provide a system and method for transferring mail between containers that ensures mail does not lose its orientation, sequence or become lost in the transfer process, in the ways described in this application. There is therefore a need for an efficient and effective mail transfer system and method.

The present invention provides a reliable system and method for transferring mail between containers that solves the above cited problems and overcomes the deficiencies of the prior art.

SUMMARY OF THE INVENTION

In accordance with a first aspect of the present invention, a system for transferring mail between containers includes an input tray configured to hold mail, where the input tray has a bottom and one or more openings formed in the bottom of the input tray; one or more rods movable between a retracted position when the input tray is positioned above the rods, and an extended position wherein the rods project through the openings of the input tray to eject mail from the input tray; an output tray configured to hold mail; and a transfer box, movable between a first position to receive mail ejected from the input tray and a second position to deposit mail into the output tray.

In accordance with a second aspect of the present invention, a method for transferring mail between containers includes a first step of moving an input tray containing mail into an unloading position, above one or more transfer rods; a second step of moving a transfer box to a first position above the input tray at the unloading position; a third step of ejecting the mail contained within the input tray into the transfer box by extending one or more transfer rods through one or more openings in the bottom of the input tray; a fourth step of moving said transfer box from said first position to a second position located above an output tray; and a fifth step of depositing the mail into the output tray from the transfer box.

The above and other features and advantages of the present invention, as well as the structure and operation of preferred embodiments of the present invention, are described in detail below with reference to the accompanying drawings in which like reference numbers indicate identical or functionally similar elements.

DETAILED DESCRIPTION OF PREFERRED EMBODIMENTS

Figure 1A:
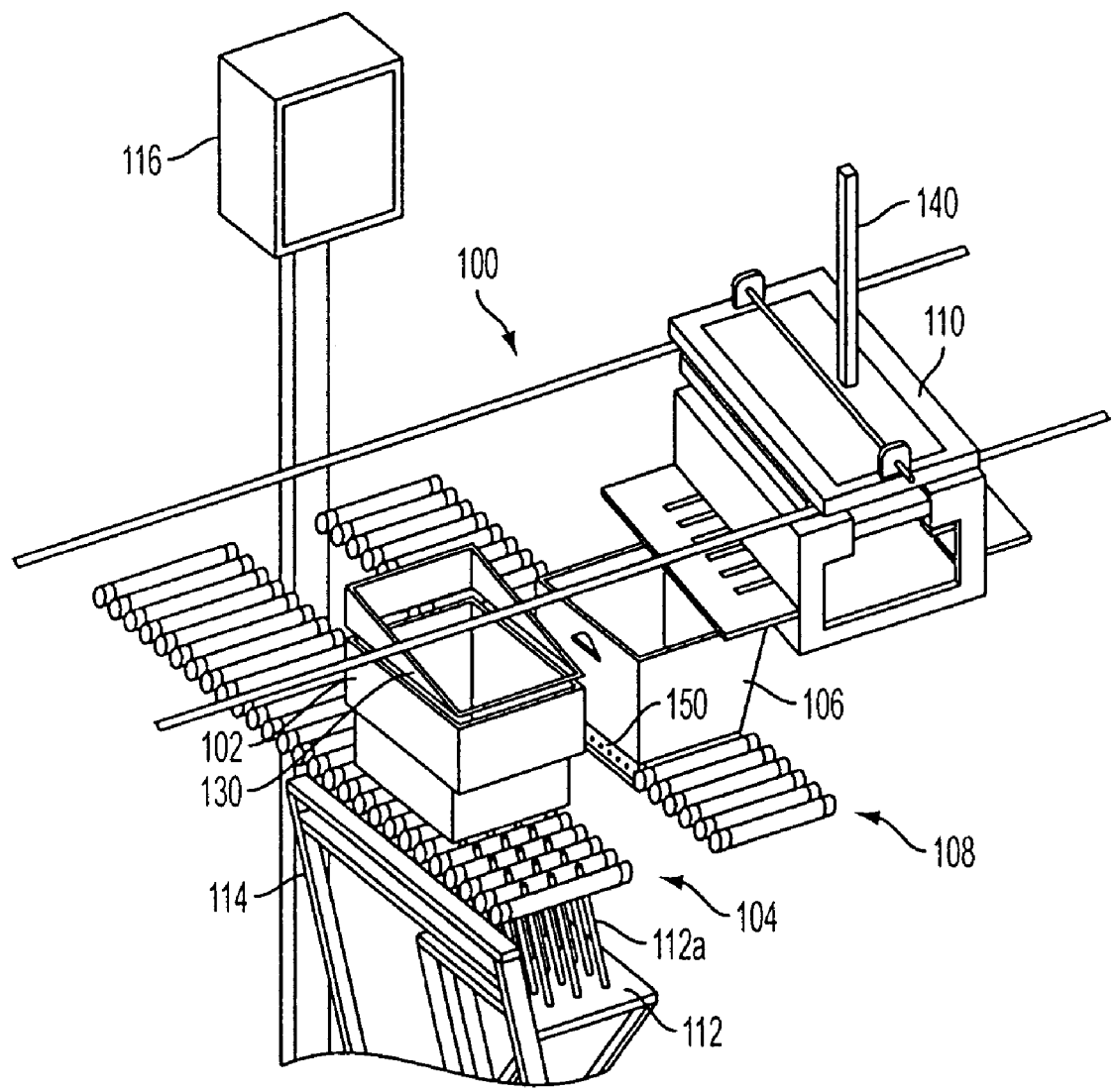
FIG. 1A is a perspective view of a tray transfer system according to the present invention.
Figure 1B:
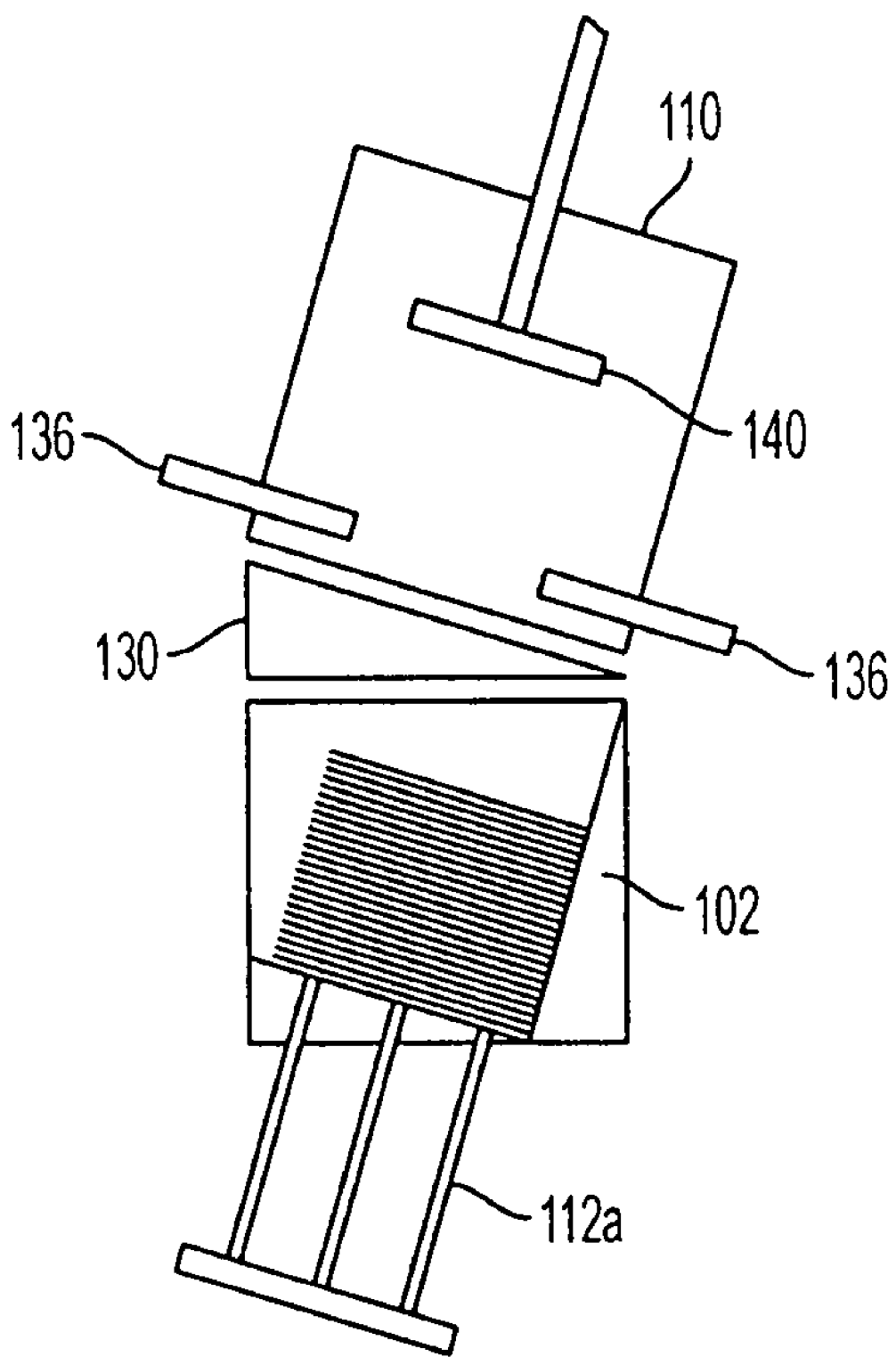
FIG. 1B is a partial side view of the tray transfer system shown in FIG. 1B.

FIG. 1A and 1B show a system 100 for transferring mail between containers in an orderly and secure manner according to a preferred embodiment of the present invention. The tray transfer system 100 includes an input tray 102 configured to hold and carry a plurality of mail pieces ("mail stack" or "mail") and travel along a first roller conveyor system 104. "Mail" in the context of this application could include letters, flats, flyers, post cards, and the like. The system 100 also includes an output tray 106 configured to receive a mail stack transferred from a given input tray and travel along a second roller conveyor system 108. The system 100 also includes a transfer box assembly 110 configured to move between a first position wherein the transfer box receives the mail stack from the input tray 102 and a second position wherein the transfer box deposits the mail stack into the output tray 106. The transfer box assembly 110 is preferably moved between the first position and the second position by automation equipment constructed of components known in the art. The system 100 also includes a transfer rod assembly 112 having a plurality of transfer rods 112a that are movable from a retracted position spaced below the upper surface of conveyor 104 to an extended position wherein the rods protrude upwardly through openings in the bottom of the input tray 102, to make contact with the mail stack and push the mail stack out of the input tray 102 and into the transfer box assembly 110 at the appropriate time in the process. The system 100 preferably also includes a cradle 150 configured to support and tilt the output tray 102 at an angle when the transfer box 110 unloads a mail stack into the output tray 106. The system 100 also includes a frame 114 configured to support one or more of the input tray 102, the first conveyor 104, the output tray 106, the second conveyor 108, the transfer box assembly 110 and the transfer rod assembly 112. The system 100 also includes a computerized controller 116 and automation components, such as pistons, servo-motors and the like, responsive to signals from the controller to cause the above cited system 100 elements to function in the manner described herein.

Figure 2:
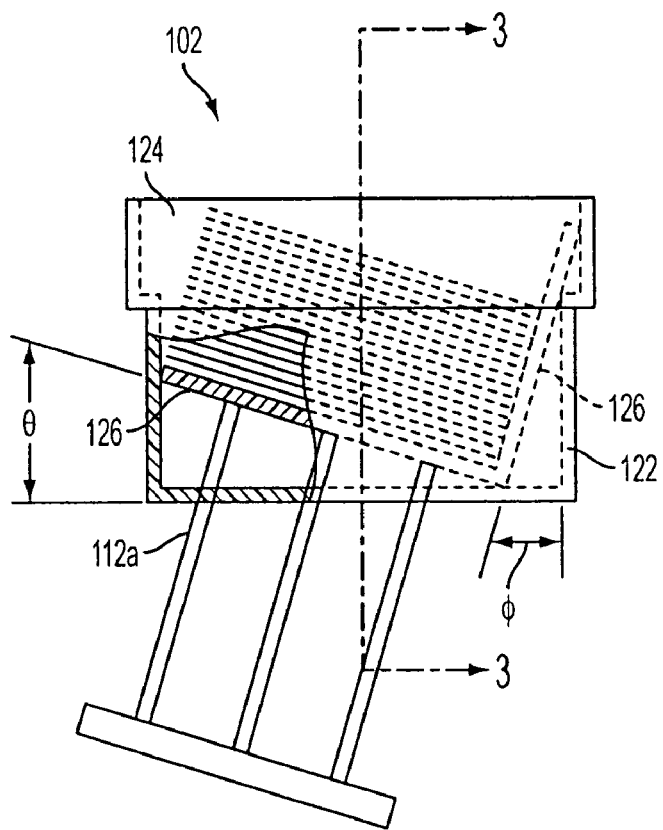
FIG. 2 is a side view with a partial cut-away of an input tray for use in a tray transfer system according to the present invention.
Figure 3:
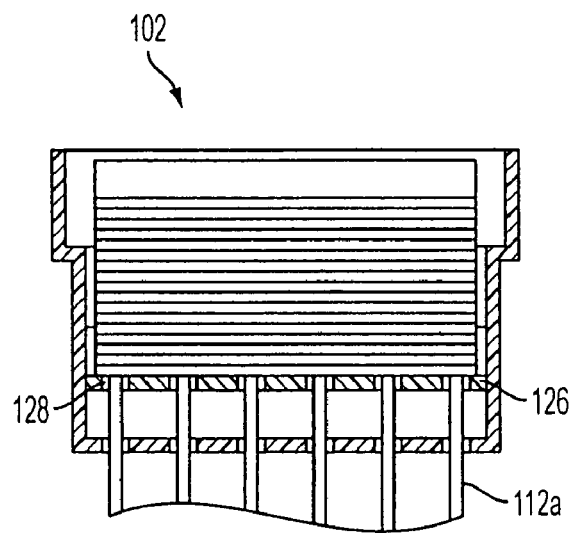
FIG. 3 is a cross-sectional view of the input tray shown in FIG. 2

FIG. 2 shows the input tray 102 which includes input tray walls 122 extending upwardly from a bottom wall to define an input tray cavity 124 for holding mail. The input tray 102 has internal walls or partitions arranged to form a v-shaped false bottom 126. The lower wall defining the false bottom 126 (i.e. the lower part of the "v") is oriented relative to the bottom wall at an angle Θ. The upper wall defining the false bottom 126 is at an angle φ relative to the input tray wall 122. The false bottom cradles the mail stack so that the plane created by the bottom of the mail stack is substantially parallel with the ends of the transfer rods 112a (as shown in FIG. 1B. Openings 127 and 128 in the bottom wall and the false bottom, respectively, are configured to register with the transfer rods 112a when the input tray 102 is in an unloading position. The openings 127 and 128 allow the transfer rods 112a to pass through the bottom of the container and contact the bottom of the mail stack. Openings 128 in the false bottom 126 are shown as elongated slots in FIG. 3. The slots 128 are wide enough to allow passage of rods 112a but are sufficiently narrow so that solid portions of the false bottom 126 provide adequate support for the mail stack to maintain orientation and sequence during the transfer process. The input tray 102 is configured to be compatible with automation equipment known in the art, that is, the input tray 102 is designed to enable automated tray handling and document extraction as described herein.

The output tray 106 can be any of a variety of mail trays well-known in the art, including USPS standard "flats trays" (i.e., open top mailtubs with hand holes, as shown) that are commonly used to transport mail outside the facility or between two mail processing facilities; however, any container of sufficient size and shape to receive a mail stack transferred from the input tray 102 and transfer box assembly 110 can be used. The output tray 106 should also be capable of moving along a roller conveyor 108 in sequential movements as dictated by the automation system, and preferably should be capable of being taken outside the mail processing facility by mail carriers and the like.

Figure 4:
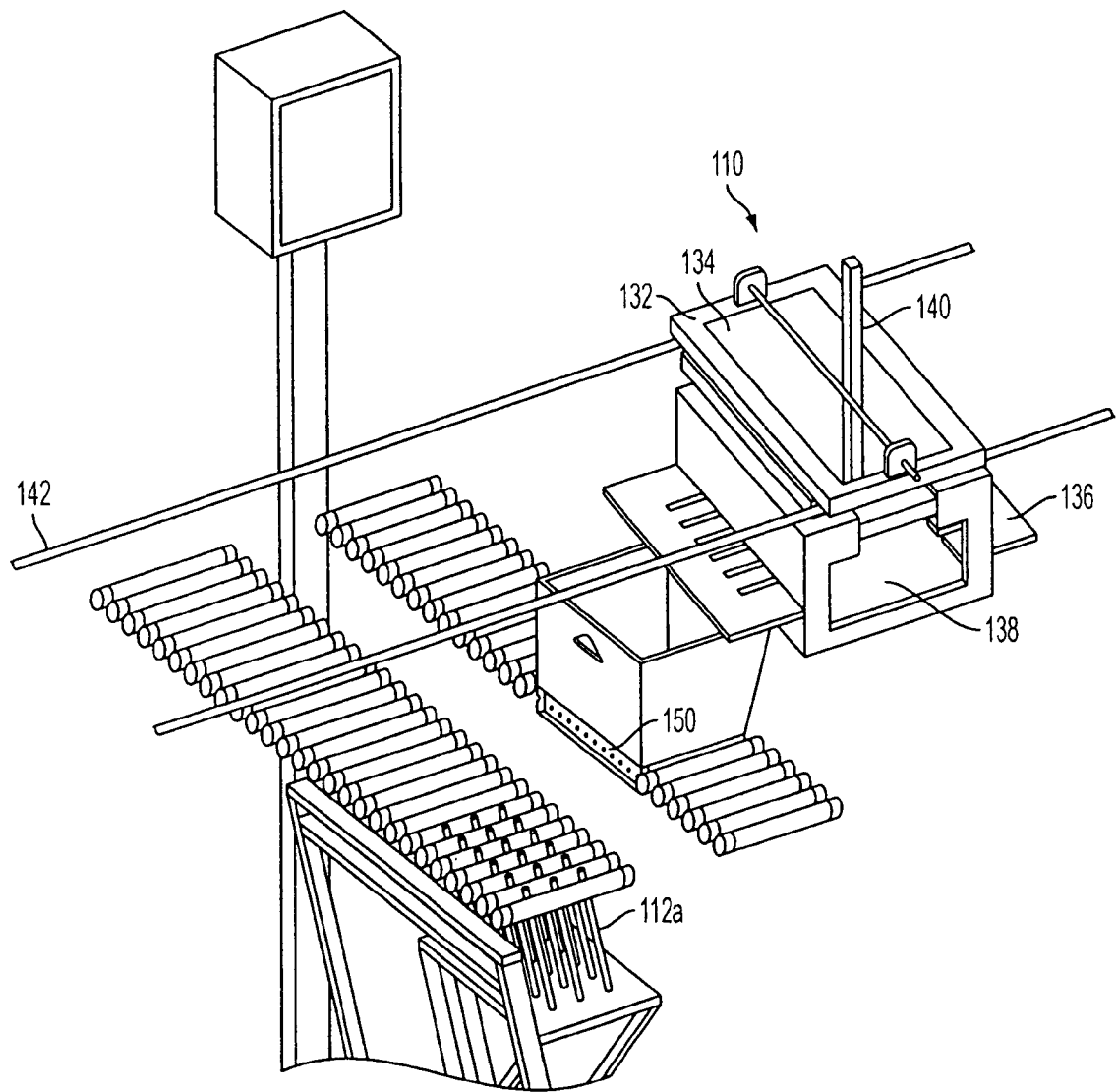
FIG. 4 is a perspective view of a transfer box assembly for use in a tray transfer system according to the present invention.

FIG. 4 shows the transfer box assembly 110 which includes a transfer box having generally rectangular walls 132 defining a transfer box cavity 134. As explained in more detail below, in the preferred embodiment, when the system is in operation, the bottom or lower edge of the transfer box 110 is positioned at an angle relative to the input tray 102 (and conveyor 104) to substantially match the angle of false bottom 126. Therefore, since the plane created by the bottom of the transfer box 110 is, in this preferred embodiment, typically not parallel with the plane created by the top of the input tray 102 when the transfer box 110 comes into the first position over the input tray 102, a wedge-shaped flange 130 is provided between the bottom of the transfer box 110 and the top of the input tray 102. The flange 130 is preferably fixed to the frame 114, but in other embodiments could be mounted on the lower edge of the transfer box 110 or on the upper edge of the input tray 106. The flange 130 occupies the gap that would otherwise be present between the transfer box 110 and input tray 102 in the absence of the flange 130. The angle of flange 130 is preferably between about 0 to about 45 degrees, and more preferably from about 20 to about 30 degrees, although other angles can be used depending on the given application. The angle of flange 130 should substantially match the relative position of the transfer box assembly 110 as the transfer box assembly 110 is positioned over the input tray 102 to receive mail ejected from the input tray 102 via the transfer rod assembly 112. Using the flange 130 to match the top of the input tray 102 with the bottom of the transfer box 110 ensures that the two containers mate with each other, and that no large crevices or gaps are present between the containers when the mail is transferred from the input tray 102 to the transfer box 110, and no mail slips out during transfer. The transfer box 110 also has sliding hatch doors 136 that slide open and close in a horizontal direction at or near the bottom of the transfer box 110. The sliding hatch doors 136 have slots 138 so that the doors 136 can close over the plurality of transfer rods 112a without obstruction after the rod assembly 112 has pushed the mail stack into the transfer box cavity 134. That is, when the transfer box assembly 110 is in a position substantially over the input tray 102, the transfer box doors 136 are in an open position so that the bottom of the transfer box 110 is unobstructed.

After the transfer rods 112a push the mail stack from the input tray 102 into the transfer box cavity 134, the bottom slotted doors 136 slide past the plurality of transfer rods 112a and underneath the mail stack, closing the transfer box and providing support for the mail stack. The slotted hatch doors 136 also allow for withdrawal of the transfer rods 112a.

As indicated above, the transfer box assembly 110 travels at an angle relative to the plane created by the top of the input tray 102, output tray 106 and roller conveyors 104, 108. The bottom of the transfer box 110 is substantially parallel with the plane created by the ends of the transfer rods 112a, false bottom 126 and upper surface of the flange 130. This way, the transfer rods 112a push the mail stack in a substantially linear direction relative to false bottom 126, flange 130, and transfer box assembly 110.

The transfer box assembly 110 also has a paddle 140 located proximate the top of the transfer box cavity 134 and movable perpendicular to the plane of the stack such that when the stack is transferred to the transfer box cavity 134 from the input tray 102, and when the bottom slotted doors 136 are in the closed position, the paddle 140 can exert a sufficient amount of force (e.g., about one pound) on top of the mail stack to ensure the mail remains secure during loading and transfer. The paddle 140 is also configured to apply downward acceleration force, by virtue of a piston, spring, actuator or other mechanism known in the art, during transfer from the transfer box 110 to the output tray 106. The paddle 140 applies downward force and acceleration greater than that exerted by gravity. This, of course, occurs when the bottom doors 136 open and once the transfer box 110 is in the second position substantially over the top of the output tray 106. The transfer box assembly 110 can slide back and forth horizontally between the first position over the input tray 102 and second position over the output tray 106 by virtue of rails 142 and automation equipment known in the art such as servo motors, actuators and the like.

Figure 5:
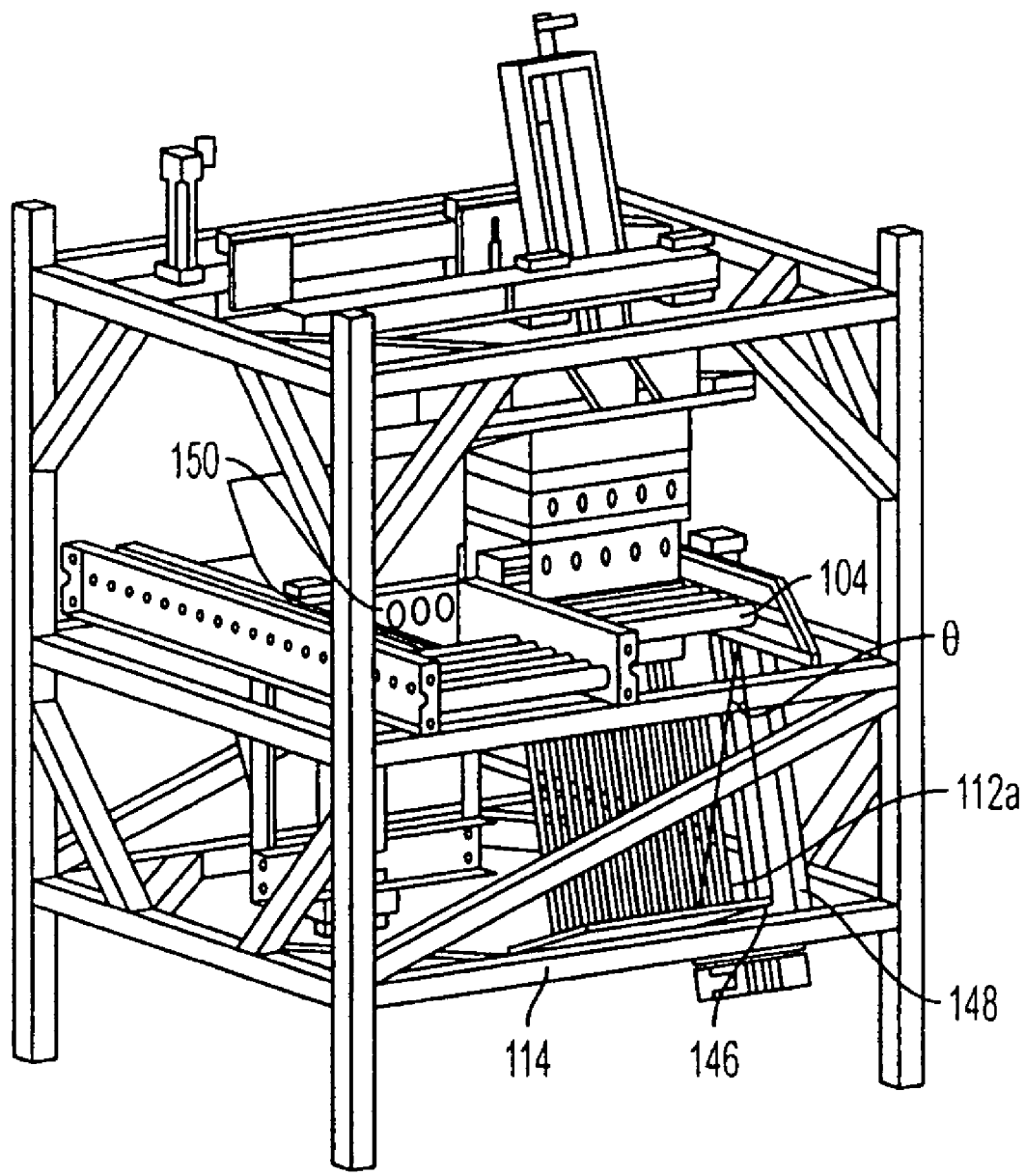
FIG. 5 is a perspective view of a tray transfer system according to the present invention.

The transfer rod assembly 112, as shown in FIG. 5, includes a platform 146 that travels along a fixed angle within the frame 114 by virtue of any of a number of methods, including an actuator rail assembly 148. Transfer rods 112a are connected to the platform 146 in a perpendicular direction from the platform 146 so that when the platform 146 travels along the rail assembly 148 at a fixed angle, the transfer rods 112a travel along substantially parallel to that angle. The transfer rod assembly 112 moves upward and downward, similar to a piston, as the process moves along, pushing mail stacks upward and into the transfer box 110 on its upward stroke, and withdrawing from the transfer box 110 and input tray 102 on its downward stroke.

At least the first roller conveyor 104 is configured so that the transfer rods 112a from the transfer rod assembly 112 can move through the plane created by the first roller conveyor 104 and false bottom 126 of the input tray 102 without obstruction. That is, in the preferred embodiment, the transfer rods 112a are configured to register with gaps located between the rollers, so that when the transfer rod assembly 112 moves on its upward stroke, the transfer rods 112a do so unobstructed by the first roller conveyor 104. Alternatively, at least the first roller conveyor 104 could include rollers or wheels that run along the outer lateral edges of the conveyor and are spaced apart leaving the center portion 150 free of obstruction, thereby allowing the transfer rods to pass through the conveyor. The roller conveyors 104, 108 can be any number of conveyors known in the art and capable of handling rapid start and stop functions while carrying input 102 and output trays 106, both empty and full of mail stacks, so long as there are adequate gaps or openings therein to permit passage of transfer rods. For example, the conveyors could comprise rollers, but could also comprise belts, chutes and the like with suitable opeings to accommodate the transfer rods.

In a preferred embodiment, the system 100 also includes a tilting mechanism 150, such as a cradle, that is initially located underneath the second roller conveyor 108 and output tray 106 when the output tray is moves into loading position. The cradle is configured to contact, cradle and tilt the output tray 106 at an angle substantially equal to the plane created by the bottom of the transfer box 110 when the transfer box 110 is positioned over the output tray 106. In this embodiment, the cradle 150 is located along the conveyor path and is configured to secure and tilt the output tray 106 when the transfer box 110 is positioned substantially above the output tray. In an alternative embodiment, the cradle 150 can be configured to have fingers defining the cradle that register with gaps 108a between the rollers 108b so that the cradle 152 may protrude through the conveyor to tilt the output tray 106 without obstruction.

FIG. 5 also shows an example of a system frame 114 which provides the overall structure upon which the above cited elements can be secured for operation. The frame 114 can be made of any number of structural elements known in the art including without limitation steel, aluminum or plastic structural members that are fastened or otherwise joined together to form an interconnected structure of suitable strength and size for the purpose. The frame 114 should be rigid enough to allow for rapid movement of the above cited elements and be able to support the various loads and cycles that are inherent in such an automated process.

As shown in FIG. 1, the system 100 also includes a controller 116 configured to control the movement and timing of the moving parts and elements of the system 100. Any type of controller known to those skilled in the art can be used including, computerized controllers with memory storing software or firmware that is executed to control the system 100 to perform the steps described below with reference to FIGS. 6A-6E.

Figure 6A:
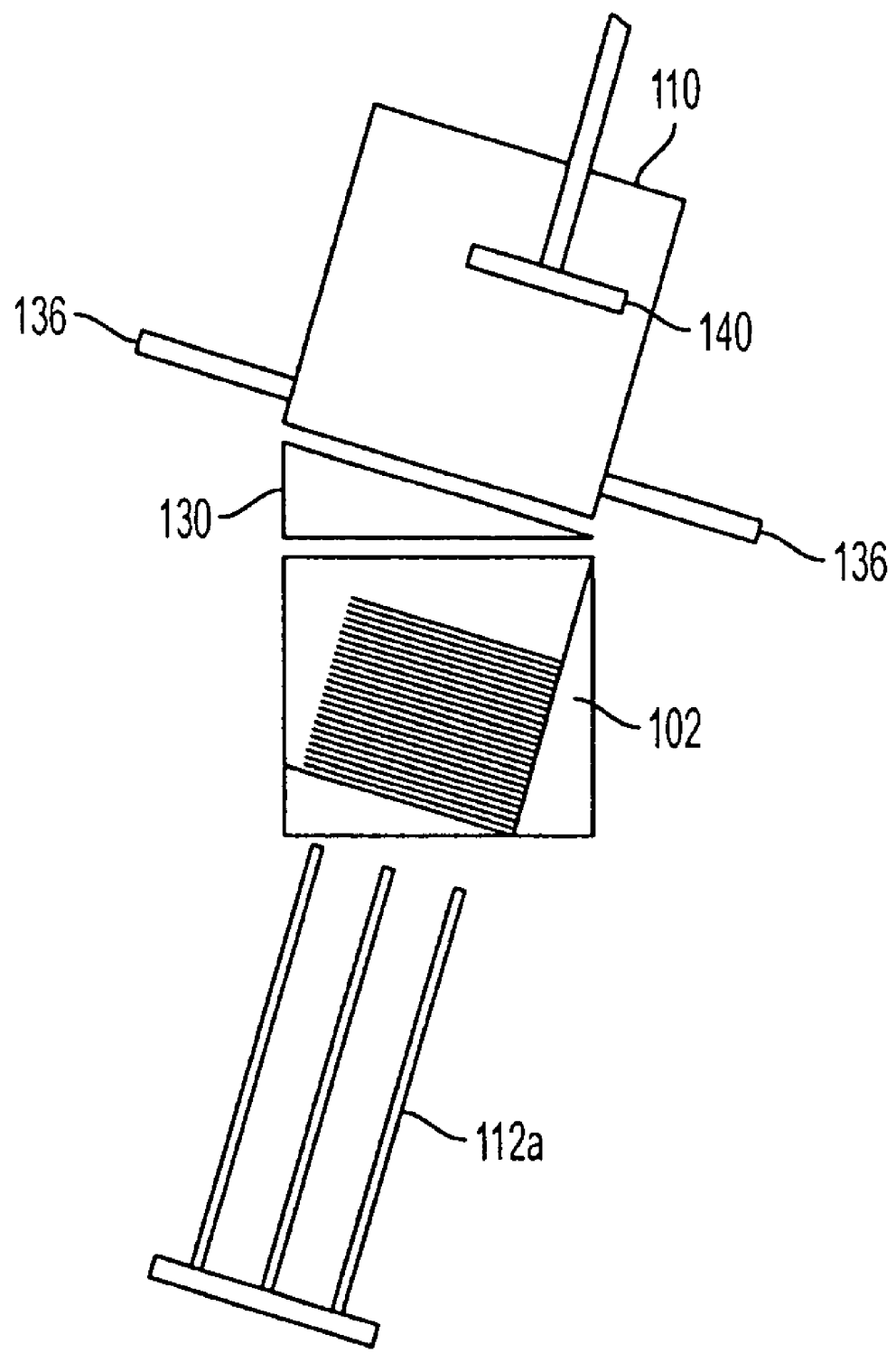
FIGS. 6A-6E show cross sectional views of a tray transfer system performing the steps of transferring mail stacks between containers according to the present invention.
Figure 6B:
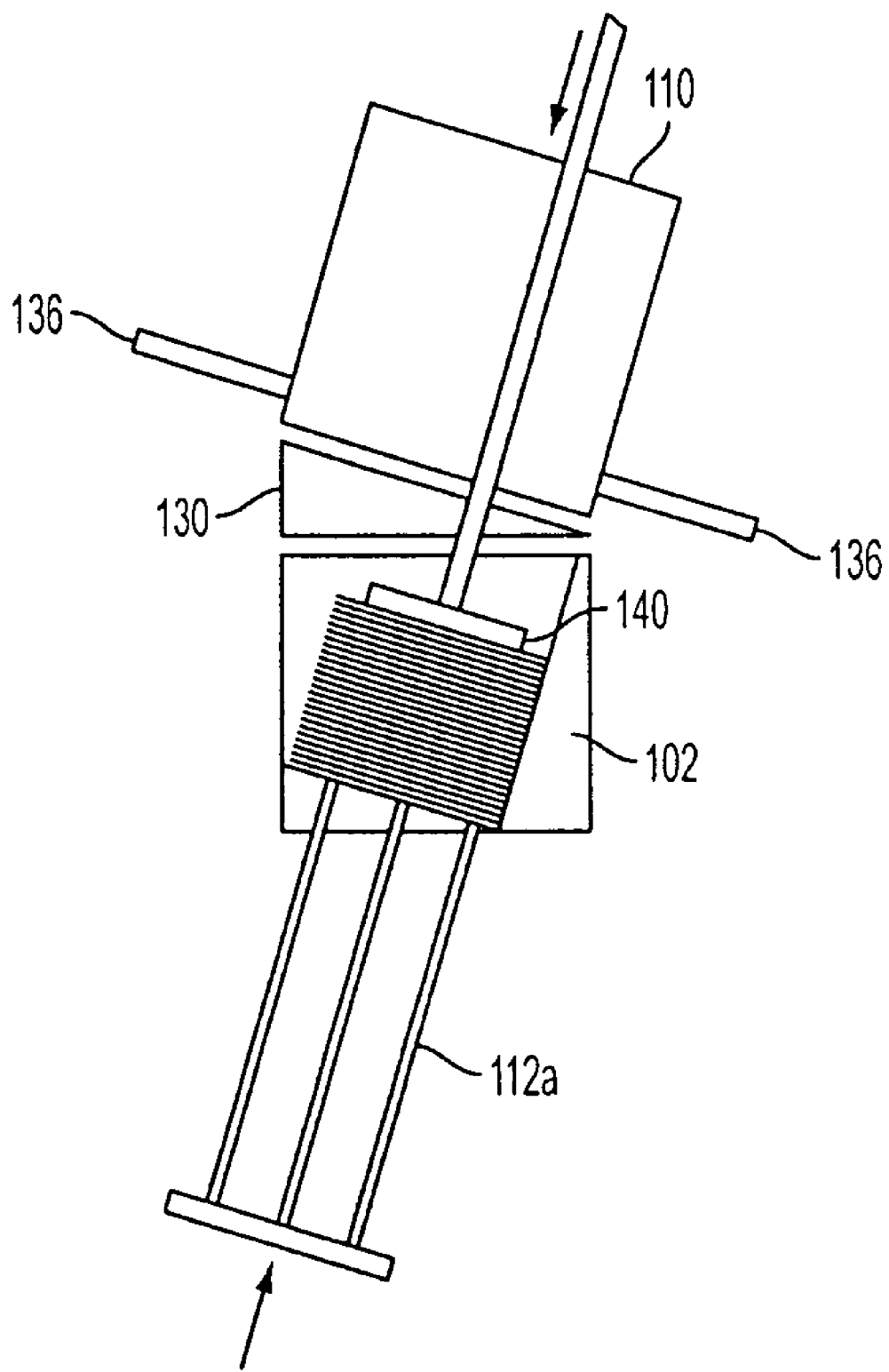
Figure 6C:
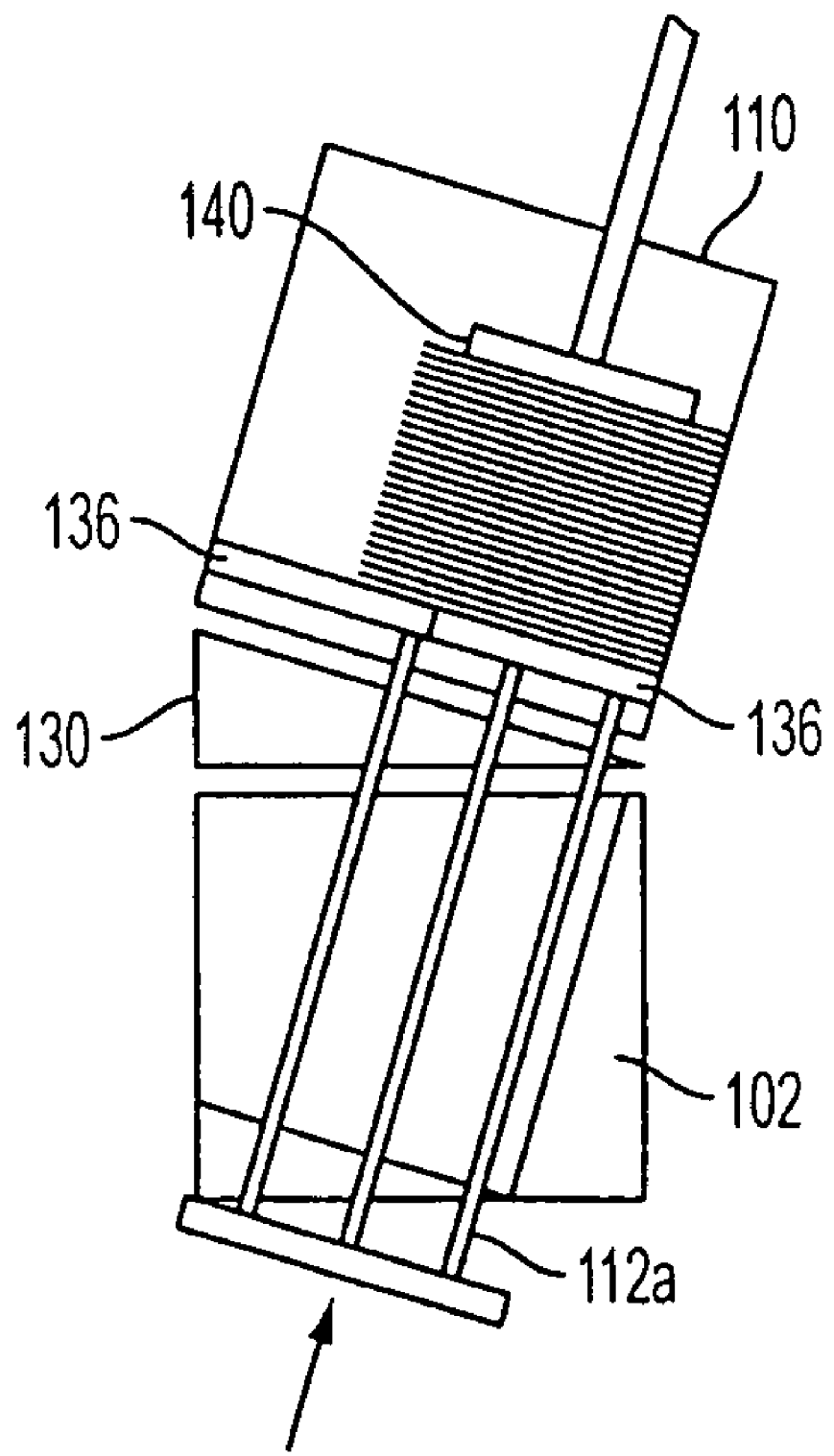
Figure 6D:
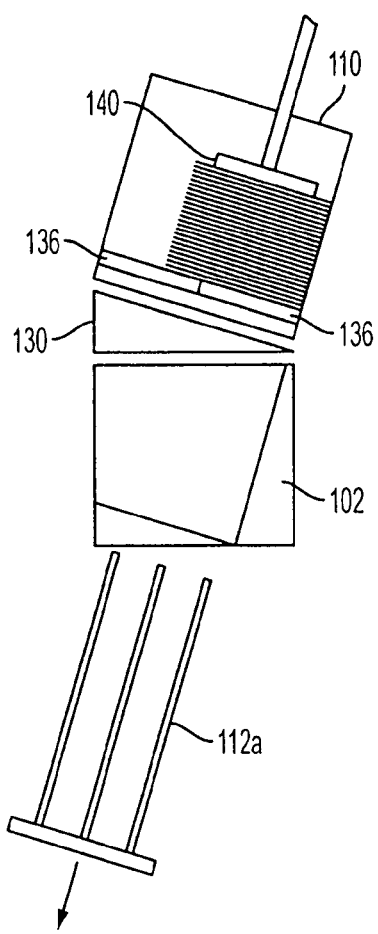
Figure 6E:
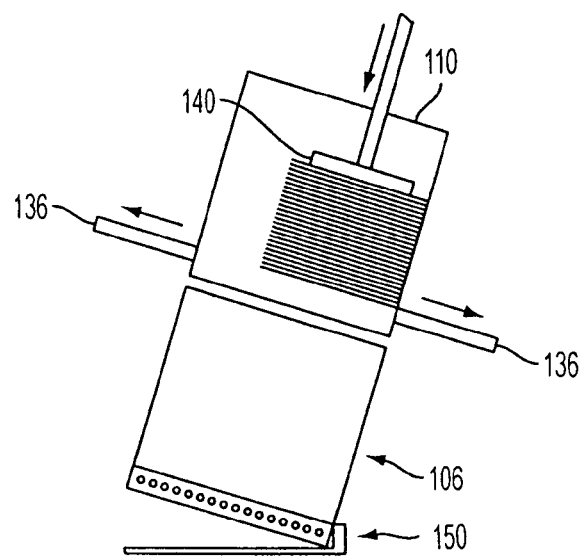

As shown in FIG. 6A, in a preferred embodiment, as the system 100 operates, the first roller conveyor 104 moves the input tray 102 having a mail stack into an unloading position above the transfer rod assembly 112. Simultaneously, in advance, or soon thereafter, the transfer box assembly 110 moves substantially above the input tray 102 such that flange 130 is disposed therebetween and there are no substantial spaces, gaps or crevices between the bottom edge of the transfer box 110 and the top of the input tray 102. At the time the transfer box assembly 110 is substantially above the input tray 102 the transfer box doors 136 are in the open position so that the bottom of the transfer box 110 is open, exposing the transfer box cavity 134. As shown in FIG. 6B, the transfer rods 112a begin to push through the opening 127 and 128 in the bottom and false bottom of the input tray 126 and make contact with the mail stack in the input tray 102 while the transfer box paddle 140 exerts force on top of the mail stack, pinching the mail stack between the paddle 140 and ends of the transfer rods 112a. As shown in FIG. 6C, the ejection rod assembly 112 moves upwardly at a predefined angle perpendicular to the false bottom of the tray, and thereby pushes the mail stack out of the input tray 102 and through the bottom of the transfer box 110 and into the transfer box cavity 134. Then, the slotted transfer box bottom doors 136 slide closed across the transfer rods 112a and underneath the mail stack. As shown in FIG. 6D, the transfer rods 112a withdraw, leaving the mail stack supported within the transfer box 110 by virtue of the slotted bottom doors 136. The transfer box paddle 140 exerts a force on top of the mail stack within the transfer box 110 so as to secure the mail stack in sequence and position. As shown in FIG. 6E, once the mail stack is secure and ready for transfer, the transfer box assembly 110 moves from the first position to a second position, substantially above the output tray 106 on the second conveyor 108. That is, prior to, subsequent to, or as the transfer box 110 moves from the first position to the second position, the output tray 106 moves on a second conveyor 108 into the second position, ready to receive the mail stack from the transfer box 110. When the transfer box 110 is in the second position and substantially above the output tray 106, the cradle 150 tilts the output tray 106 at an angle substantially parallel with the plane created by the bottom of the transfer box 110. Also at this time, the bottom doors of the transfer box 136 open, and the paddle 140 accelerates the mail stack in a downward direction, preferably at a rate sufficient to maintain the sequence and position of the mailstack and so as to prevent the mail stack from coming apart (e.g. at a rate faster than 9.8 meters/second, i.e., faster than the acceleration of gravity). Accelerating the mail stack faster than the acceleration of gravity minimizes the risk that the mail within the mail stack becomes disorganized during the fall from the transfer box 110 to the output tray 106. This process may be repeated so that the transfer box 110 is continuously picking up a mail stack at the first position and dropping a mail stack at the second position as it moves back and forth between the two positions. All the while, the transfer rod assembly 112 and conveyors 104, 108 perform their functions so as to create a continuous automated process for transferring mail stacks between containers, while minimizing loss and shuffling.

The controller 116 controls the movement and overall automation of the roller conveyors 104, 108, the ejection rod assembly 112 and the transfer box assembly 110 by signaling the various devices and actuators in the system 100. One of ordinary skill in the art will recognize that any of a number of controllers and devices can enable such movement and coordination.

Accordingly, as the system 100 operates, stacks of mail are successfully moved from the first tray to the second tray in a secure manner and without risk of their losing sequence or organization. The system and method described herein are particularly advantageous in use as part of multi-pass sorting systems and processes, where maintaining organization and sequence of mail are particularly important.

Thus, the breadth and scope of the present invention should not be limited by any of the above-described exemplary embodiments, but should be defined only in accordance with the following claims and their equivalents. For example, while the input tray has been shown and described as having slotted openings in its bottom surfaces, it will be appreciated that other types of openings can be used, such as circular, elliptical or rectangular openings. Similarly, while plural ejecting rods are shown, it will be appreciated that a single piston or rod of appropriate dimension can be used to push mail out of the input tray. Furthermore, in regard to the described tilting mechanism, it will be appreciated that any mechanism that tilts a portion of the conveyor, or protrudes through the conveyor to tilt the output tray, or controls a tilt angle of the transfer box can be used.

What is claimed is:

1. A system for transferring mail between containers comprising:
    an input tray configured to hold mail, said input tray having;
        a bottom,
        a plurality of input tray walls extending generally upwardly from said bottom of said input tray to define a cavity to hold mail, and
        one or more openings formed in said bottom of said input tray;
    one or more rods movable between a retracted position spaced from said bottom of said input tray, and an extended position wherein said one or more rods project through said one or more openings of said input tray to eject mail from said input tray;
    an output tray configured to hold mail; and
    a transfer box, movable between a first position to receive mail ejected from said input tray and a second position to deposit mail into said output tray.

2. The system of claim 1, wherein said transfer box has at least one bottom door movable between an open position to receive mail from said input tray and a closed position to retain mail in said transfer box, 3. The system of claim 2, wherein said at least one bottom door has at least one opening configured to close over said one or more rods and support said mail received from said input tray.

4. The system of claim 1, wherein an upper edge of said input tray is oriented at an angle relative to a bottom edge of said transfer box.

5. The system of claim 1, wherein said transfer box has a paddle configured to contact and stabilize said mail during transfer.

6. The system of claim 5, wherein said paddle is further configured to push said mail into said output tray.

7. The system of claim 1, wherein said system contains first and second conveyors, wherein said first conveyor is configured to convey said input tray to and from an unloading position and wherein said second conveyor is configured to convey said output tray to and from a loading position.

8. The system of claim 7, further comprising a frame, and wherein said transfer box is mounted on said frame for movement between positions substantially above said first and second conveyors.

9. The system of claim 7, wherein said first conveyor has one or more openings formed therein in registration with said one or more rods.

10. The system of claim 1, wherein a plane defined by ends of said rods is substantially parallel with a plane defined by said mail within said input tray.

11. The system of claim 1, wherein said input tray has a false bottom oriented at an angle relative to said bottom.

12. The system of claim 11, wherein said false bottom has one or more openings formed therein in registration with said one or more rods.

13. The system of claim 1, further comprising a control system that automatically stops said input tray in said unloading position, moves said transfer box over said input tray, opens said transfer box door, moves said rods from said retracted position to said extended position so that the rods protrude through said openings in said bottom of said input tray, closes said transfer box doors around said rods, retracts said rods, stops said output tray in said loading position, moves said transfer box from said first position to said second position over said output tray, opens said bottom doors of said transfer box, and pushes said mail downward from said transfer box into said output tray.

14. The system of claim 1, wherein said output tray is a standard mail carrier tray, 15. A method for transferring mail between containers comprising:
    moving an input tray containing mail into an unloading position, above one or more transfer rods;
    moving a transfer box to a first position above the input tray at the unloading position;
    ejecting the mail contained within the input tray into the transfer box by extending one or more transfer rods through one or more openings in the bottom of the input tray;
    moving said transfer box from said first position to a second position located above an output tray; and
    depositing the mail into the output tray from the transfer box, 16. The method of claim 15, wherein said step of depositing the mail into the output tray includes pushing the mail downward into the output tray.

17. The method of claim 16, further comprising the step of opening a bottom of the transfer box prior to pushing the mail downward.

18. The method of claim 15, further comprising the steps of opening a bottom of the transfer box prior to ejecting mail and closing the bottom of the transfer box after the mail is received in the transfer box.

19. The method of claim 15, wherein said step of moving the input tray into an unloading position includes transporting the input tray on a conveyor having one or more openings formed in registration with the transfer rods at the unloading position.

20. The method of claim 15, further comprising a step of tilting the output tray to receive the mail.

* * * * *